(12) United States Patent
Breitbach et al.

(10) Patent No.: US 8,275,536 B2
(45) Date of Patent: Sep. 25, 2012

(54) METHOD FOR THE DETERMINATION OF AN INJECTED FUEL MASS OF A PREINJECTION

(75) Inventors: Thomas Breitbach, Stuttgart (DE); Rainer Peck, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 301 days.

(21) Appl. No.: 12/670,217

(22) PCT Filed: Jun. 10, 2008

(86) PCT No.: PCT/EP2008/057217
§ 371 (c)(1),
(2), (4) Date: Jan. 22, 2010

(87) PCT Pub. No.: WO2009/013058
PCT Pub. Date: Jan. 29, 2009

(65) Prior Publication Data
US 2010/0191443 A1    Jul. 29, 2010

(30) Foreign Application Priority Data
Jul. 24, 2007   (DE) .......................... 10 2007 034 335

(51) Int. Cl.
*G06F 7/06*      (2006.01)
*G06F 7/00*      (2006.01)

(52) U.S. Cl. ........................ 701/104; 123/299; 123/300

(58) Field of Classification Search ............... 701/103, 701/104, 106; 123/674, 456, 478, 299, 300, 123/304, 305
See application file for complete search history.

(56) References Cited

U.S. PATENT DOCUMENTS

| | | | |
|---|---|---|---|
| 5,043,901 A * | 8/1991 | Miyazaki et al. | 701/113 |
| 6,161,530 A * | 12/2000 | Kakizaki et al. | 123/674 |
| 6,779,511 B2 * | 8/2004 | Tonetti et al. | 123/480 |
| 2003/0033800 A1 * | 2/2003 | Tonetti et al. | 60/286 |
| 2004/0089273 A1 * | 5/2004 | Tonetti et al. | 123/480 |
| 2009/0177366 A1 | 7/2009 | Achleitner et al. | |
| 2009/0299604 A1 | 12/2009 | Samenfink et al. | |

FOREIGN PATENT DOCUMENTS

| | | |
|---|---|---|
| DE | 10 2005 051701 | 5/2007 |
| DE | 10 2006 023468 | 9/2007 |
| EP | 1 420 157 | 5/2004 |
| JP | 2001098989 | 4/2001 |

* cited by examiner

*Primary Examiner* — Mahmoud Gimie
(74) *Attorney, Agent, or Firm* — Merchant & Gould P.C.

(57) ABSTRACT

A method for the determination of a fuel mass of a pre-injection injected into at least one combustion chamber of an internal combustion engine by means of at least one injection under high pressure is characterized in that a corrective variable is determined for the pre-injection by means of a comparison between a measure for the actual amount of injected fuel of at least one test post-injection carried out for a predetermined target amount of a desired pre-injection due to a measure, and the measure for the target amount.

11 Claims, 1 Drawing Sheet

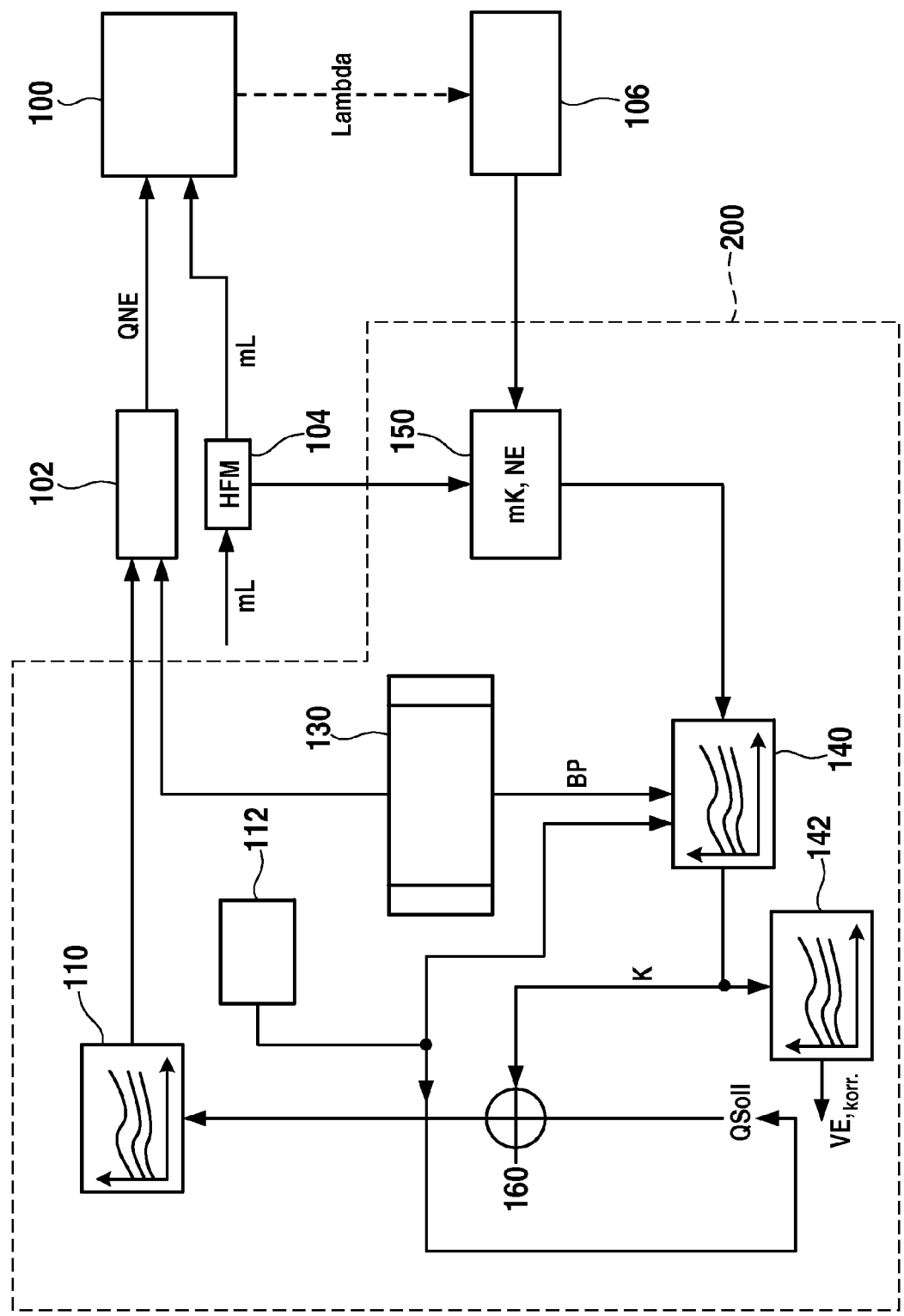

METHOD FOR THE DETERMINATION OF AN INJECTED FUEL MASS OF A PREINJECTION

This application is a National Stage Application of PCT/EP2008/057217, filed 10 Jun. 2008, which claims benefit of Serial No. 10 2007 034 335.5, filed 24 Jun. 2007 in Germany and which applications are incorporated herein by reference. To the extent appropriate, a claim of priority is made to each of the above disclosed applications.

BACKGROUND

The invention relates to a method for determining a fuel mass of a pre-injection that is injected into at least one combustion chamber of a combustion engine as well as a device for implementing the method according to the category of the independent claims.

For operating modern combustion engines, in particular self-injecting diesel motors a highly accurate metering of the fuel mass is required at very high injection pressures. The precision of the controlled fuel metering is however limited at modern injection systems by the manufacturing accuracy on the one hand and characteristics of the components of the injection system that change over the life time of the combustion engine on the other hand, in particular drift appearances, which for example cause increased tolerances. The achievable accuracy is now often not sufficient in order to comply with motoric requirements. Particularly inaccuracies of the pre-injection cause significantly increased emissions depending on the operating point, for example in partial load operation, or conspicuous and therefore annoying combustion noises. Therefore there is an interest in knowing the injected fuel amount very accurately and in particular the deviations of the actual injection amount that actually occurs during the operation of the combustion engine from the desired injection amount, in order to carry out corresponding corrections of the controlling of the injection valves and thus to be able to ensure a correct injection amount.

SUMMARY

The procedure according to the invention allows it to determine the fuel mass of a pre-injection that has been injected into at least one combustion chamber of a combustion engine with the aid of at least one injection under high pressure very precisely. This takes thereby place, in that a corrective variable is determined for the pre-injection by means of a comparison of a measure for the actual amount of the injected fuel of at least one test post-injection, which is carried out due to a measure for a default nominal amount of a desired pre-injection, and the measure for the nominal amount of this test post-injection. With the aid of this corrective variable the parameters of the controlling of the injection valves can be corrected and therefore a correct injection amount ensured. In other words the procedure allows to determine the relation between the real and desired injection amount of this test post-injection from the actually injected fuel mass of the post-injection, whose injection amount is so chosen that it is equivalent to a desired pre-injection, and to derive from this the corrective variable for the pre-injection, which means a correction of the parameters of the controlling of the injection valves, in order to ensure a correct injection amount for a pre-injection in all engine operating areas.

Thus one preferred embodiment provides to determine a measure for the actual amount from a lambda signal that is measured in the exhaust gas area. With this measure the sensor signal that is provided by a lambda sensor that is already arranged in the exhaust gas area for the lambda regulation can be used for determining the measure for the actual amount.

Another possibility provides the calculation of the air value lambda that occurs in the exhaust gas area.

One embodiment provides that the corrective variable is determined in the range of a periodically happening learning procedure, which is carried out in default operating statuses of the combustion engine.

Preferably the corrective variables that have been determined in the range of the learning procedure and the measures for the actual amount of the injected fuel as well as for the nominal amounts of the injected fuel are stored in a learning engine map, which can simply be used later during the operation.

As a measure for the injected fuel mass the injected fuel amount or a control variable that characterizes the injected fuel amount, for example the control duration, can be used.

The post-injection for determining the corrective variable can be determined at a first embodiment of the procedure due to a post-injection into a combustion chamber of a combustion engine that comprises at least one combustion chamber. In doing so a learning engine map can be determined injector-individually so that a cylinder-individual correction of the injection is possible.

Another embodiment provides to determine the corrective variable due to a post-injection into all combustion chambers of a combustion engine that comprises several combustion chambers. This measure has the advantage that the average deviation of all injectors from the nominal value can be determined and correspondingly corrected.

The device according to the invention for operating a combustion engine relates at first to a control unit, which is customized for implementing the procedure. The control unit comprises preferably at least one electric storage, which stores the steps of the procedure as a computer program. The control unit furthermore comprises a special storage, which stores the different values of the corrective variable.

BRIEF DESCRIPTION OF THE DRAWING

FIG. 1: A function block describing operating an internal combustion engine according to the principles of the present disclosure.

Embodiments of the invention are illustrated in the drawing and further explained in the subsequent description.

BRIEF DESCRIPTION OF THE DRAWING

The FIGURE shows function blocks, which suit for implementing the procedure according to the invention for operating a combustion engine. FIG. 1 shows a combustion engine 100, which preferably provides several combustion chambers, for example four, into which fuel is injected with the aid of injectors. The combustion engine 100 is furthermore supplied with an air mass mL, which is detected by a familiar way with the aid of a suitable device 104, for example a hot film air mass meter HFM.

The controlling of the injectors 102 takes place targeted with the aid of a control duration engine map 110, from which the control duration of the injectors 102, which is assigned to a desired nominal amount QSoll and with which the fuel is injected into the combustion chambers, can be taken. For regulating the diesel combustion engine 100 now a highly accurate metering of the fuel mass at very high injection pressures is required. The achievable accuracy of the controlled fuel metering at modern injection systems is however one the hand limited by the manufacturing accuracy and on the other hand by a drifting of the components during the operation of the combustion engine, for example due to a wear out and such alike. Inaccuracies of pre-injections VE particularly cause significantly increased emissions depending on the operating point, for example during partial load operation, or conspicuous combustion noises.

The basic idea of the invention is now to determine deviations of the actual pre-injection amount from the desired pre-injection amount during the normal driving operation by means of a late set and comparable post-injection amount QNE and to provide it to the engine control. With this information a correction of the controlling of the injectors 102 is possible. In doing so also a correction of the tolerances of the injection system is enabled.

In order to be able to determine now the actually injected fuel mass very precisely and to able to carry out a correction of the pre-injection by doing so, the invention provides to determine the actual injection amount at at least one test injection, which is preferably carried out as a non-momentary effective post-injection, and to store the relation between the actual and desired injection amount in a learning engine map. This takes place according to the steps that are subsequently further explained.

A learn operating coordinator 130, which is part of the control unit 200, induces the controlling of the injector 102, with which fuel is injected during a post-injection QNE into a combustion chamber of the combustion engine 100. Simultaneously the injected air mass mL is determined with the aid of the hot film air mass meter 104 and the air value lambda detected for example by a lambda probe 106 and from those variables the actually injected fuel mass mK,NE is calculated in an arithmetic unit 150 during the post-injection. Even this fuel mass mK,NE is stored in the learning engine map 140. The late not momentarily effective post-injection does not affect the operation of the combustion engine but causes a change of the air surplus.

A change of lambda due to the injection can be illustrated by the relation $$\text{Delta}(1/\text{Lambda})=(14.5 \times mK,NE \times Eta)/mL,$$

whereby Eta illustrates a variable that defines a detection degree, which is for example determined empirically and takes into account that a very late post-injection does not combust completely anymore and depending on the performance of the lambda probe 106 only low HC-concentrations can be converted and detected. The measure for the detection degree Eta enables a precise image between the actually injected amount of the post-injection mK,NE and the lambda signal.

Now the difference or the relation from the so determined and a demanded fuel mass QSoll of the post-injection is determined and stored in the learning engine map 140, whose coordinates characterize the corresponding operating point BP of the injection valve sufficiently. The demanded fuel mass QSoll is determined in a pre-injection determination device 112, in which a desired test amount of a post-injection QNE is determined, which corresponds with the pre-injection amount. The so determined nominal amount QSoll is simultaneously also supplied to the learning engine map 140. Alternatively even the control parameters that belong to the measured actual fuel mass can be stored. An equivalent is also the storage of the correction of those parameters that are required in order to achieve the desired injection amount.

The previously described procedure has been explained with the aid of the injection of the fuel mass into a combustion chamber of the combustion engine that comprises several combustion chambers. The injection into a combustion chamber allows it to determine an injector individual learning engine map 140.

It shall be understood that the procedure is not limited to this.

It is furthermore also possible to carry out the post-injection in all cylinders simultaneously. By doing so the average deviation of all injectors 106 from the nominal value can be determined and stored in the learning engine map 140.

A second component of the here described function provides the application of what has been learned. The relations that have been learned thereby at test post-injections, whose parameters are the subject matter of the learning engine map 140, are subsequently considered in the normal operation of the combustion engine at the determination of the amount of the pre-injection QVE. Therefore the correcting factor K is considered at the determination of the pre-injection QVE. This correcting factor is supplied to a transfer engine map 142, in order to transfer the correcting factor K of the post-injection that has been located due to the previously described learning process onto the pre-injection requirements. Thereby the desired amount of the pre-injection QVE is changed so far that the actually injected amount corresponds again with the original amount target.

The measure for the injected fuel mass can be the fuel amount itself, as it has been described above. But instead of a deviation between the nominal and the actual fuel amount it is also possible to determine and store the required control duration correction for determining the correct actual mass. The storage of the correcting values of the control duration correction can thereby take place similar to the so-called zero amount correction. Alternatively the learning engine map can also be so construed that the required control parameters (for example the control duration) or the corresponding correcting as opposed to the nominal control parameters is stored with the determined actual fuel mass.

Which of the two variant is actually used depends also on the achievable accuracy of both variants.

The invention claimed is:

1. A method for determining a fuel mass of a pre-injection that has been injected into at least one combustion chamber of a combustion engine with at least one injection under high pressure, the method comprising:
    measuring an actual amount of injected fuel of at least one test post-injection, the at least one test post-injection implemented based on a measure of a default nominal amount of a desired pre-injection;
    comparing the measure for the actual amount and a measure for a nominal amount of the at least one test post-injection; and
    determining a corrective variable for the pre-injection based on the step of comparing.

2. The method according to claim 1 wherein the measure for the actual amount is determined from a lambda signal that is measured in an exhaust gas area.

3. The method according to claim 1 wherein the measure for the actual amount is determined from a calculated air value lambda that is occurring in an exhaust gas area.

4. The method according to claim 1 wherein the corrective variable is determined in a range of a learning procedure, which is carried out in default operating statuses of the combustion engine.

5. The method according to claim 4 wherein the corrective variables that are determined in the range of the learning procedure and the measures for the actual amounts of the injected fuel as well as the nominal amounts of the injected fuel are stored in a learning engine map.

6. The method according to claim 1, wherein the measure for the injected fuel mass is the fuel amount or control duration of a fuel injector.

7. The method according to claim 1, wherein the corrective variable is determined due to a post-injection into the at least one combustion chamber of the combustion engine.

8. The method according to claim 1, wherein the corrective variable is determined due to a post-injection in all of the combustion chambers of the combustion engine.

9. Device for operating a combustion engine wherein at least one control unit that is customized for implementing the method according to claim 1 is provided.

10. Device according to claim 9 wherein the control unit provides at least one corrective variable storage, which stores the corrective variables that have been determined during a learning procedure.

11. Device according to claim 10 wherein the corrective variable storage is a learning engine map.

\* \* \* \* \*